(12) United States Patent
Cummins et al.

(10) Patent No.: US 8,327,111 B2
(45) Date of Patent: Dec. 4, 2012

(54) METHOD, SYSTEM AND COMPUTER PROGRAM PRODUCT FOR BATCHED VIRTUAL MEMORY REMAPPING FOR EFFICIENT GARBAGE COLLECTION OF LARGE OBJECT AREAS

(75) Inventors: Holly Katherine Cummins, Winchester (GB); Anthony Phillips, Hampshire (GB); Andrew Dean Wharmby, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 12/413,661

(22) Filed: Mar. 30, 2009

(65) Prior Publication Data

US 2010/0250893 A1 Sep. 30, 2010

(51) Int. Cl.
*G06F 12/08* (2006.01)
*G06F 12/00* (2006.01)

(52) U.S. Cl. .................................. 711/203; 707/813

(58) Field of Classification Search .................. 711/203; 707/813

See application file for complete search history.

(56) References Cited

U.S. PATENT DOCUMENTS

| | | | |
|---|---|---|---|
| 5,943,692 A | 8/1999 | Marberg et al. | |
| 6,070,173 A * | 5/2000 | Huber et al. | 707/999.206 |
| 6,470,436 B1 | 10/2002 | Croft et al. | |
| 6,836,782 B1 * | 12/2004 | Fresko et al. | 707/999.206 |
| 2002/0108025 A1 | 8/2002 | Shaylor | |

OTHER PUBLICATIONS

Lim et al, "A Memory Efficient Real-Time Non-Copying Garbage Collector," 1st ACM Intl. Symp. on Memory Mgmt. (ISMM), vol. 34, Issue 3, 1998, pp. 118-129.*
Wilson et al, "Real-Time Non-Copying Garbage Collection," Position Paper for OOPSLA (Object-Oriented Programming Systems, Languages and Applications) Workshop on Memory Management, 1993, pp. 1-8.*
The Memory Management Glossary: L; [online]. 1 page. [retrieved Feb. 18, 2009]. Retrieved from the Internet: <URL: http://www.memorymanagement.org/glossary/l.html>.
P. T. Withington; How Real Is "Real-Time" GC?; OOPLSA '91 GC Workshop Oct. 6, 1991; 8 pages.
The Old New Thing: Stupid memory-mapping tricks; [online]. 3 pages. [retrieved Feb. 18, 2009]. Retrieved from the Internet <URL: http://blogs.msdn.com/oldnewthing/archive/2003/10/07/55194.aspx>.

(Continued)

*Primary Examiner* — Sanjiv Shah
*Assistant Examiner* — Glenn Gossage
(74) *Attorney, Agent, or Firm* — Schmeiser, Olsen & Watts; Alvin Borromeo

(57) ABSTRACT

A method, system and computer program product for batched remapping of virtual memory addresses for garbage collection in a large object area. A mapping from a table having a first set of virtual memory addresses and sizes of non-contiguous, page-aligned large objects in a large object area to a remapping table having a second set of virtual memory addresses is determined. In a single batch, a request is received that includes the second set of virtual addresses and requests a remapping of the large objects to the second set of virtual memory addresses. The second set of virtual memory addresses is validated, and the large objects are remapped to the second set of virtual memory addresses according to the request. The remapping results in a compaction so that the large objects are contiguous in the large object area. The remapping does not require copying data in physical memory.

20 Claims, 4 Drawing Sheets

OTHER PUBLICATIONS

Jeremy H. Brown; Massively Parallel Garbage Collection; MIT Artificial Intelligence Laboratory, Sep. 2001; 2 pages.

Hertz et al.; Page-Level Cooperative Garbage Collection; Technical report CS TR-04-16, University of Massachusetts, 2004; 10 pages.

Rodriguez-Rivera et al.; A Non-Fragmenting Non-Moving, Garbage Collector; ACM SIGPLAN Notices, vol. 34, Issue 3 (Mar. 1999); 7 pages.

* cited by examiner

METHOD, SYSTEM AND COMPUTER PROGRAM PRODUCT FOR BATCHED VIRTUAL MEMORY REMAPPING FOR EFFICIENT GARBAGE COLLECTION OF LARGE OBJECT AREAS

FIELD OF THE INVENTION

The present invention relates to automatic memory management of large object areas, and more particularly to a method, system and computer program product for performing garbage collection in large object areas by remapping virtual memory addresses.

BACKGROUND OF THE INVENTION

Conventional compaction of free space in garbage collection that uses memory copying has a negative performance impact by requiring large amounts of memory to be shifted. These known memory copying compaction techniques are expensive and cause significant paging activity with associated memory thrashing. Other conventional compaction methods are inefficient, including those that rely on virtual memory to exploit page faults to implement operating system supported read and write barriers. Furthermore, a known compaction method uses virtual memory management to decommit free pages and commit uncommitted pages, but the resulting number of pages needed, the use of three types of pages (i.e., free, live, and uncommitted), and the intermingling of uncommitted pages with live pages indicate deficiencies in complexity, effectiveness, and efficiency (e.g., additional management is required for the interspersed uncommitted pages and the need to reserve the uncommitted pages requires a reduction in the maximum heap size). Thus, there exists a need to overcome at least one of the preceding deficiencies and limitations of the related art.

SUMMARY OF THE INVENTION

The present invention may provide a computer-implemented method of batched remapping of virtual memory addresses for garbage collection in large object areas. The method comprises:

determining a mapping from a first table to a second table, wherein the first table includes a plurality of identifiers of a plurality of page-aligned large objects included in a large object area of a virtual memory, a first plurality of virtual memory addresses to which the page-aligned large objects are initially assigned, and a plurality of virtual memory sizes of the page-aligned large objects, wherein the second table includes a second plurality of virtual memory addresses to which the page-aligned large objects are assigned for a compaction of the plurality of page-aligned large objects, and wherein the page-aligned large objects are not contiguous in the large object area;

receiving a request in a single batch, wherein the request includes the second plurality of virtual memory addresses and requests a remapping of the plurality of page-aligned large objects to the second plurality of virtual memory addresses;

validating the second plurality of virtual memory addresses included in the request; and remapping the plurality of page-aligned large objects to the second plurality of virtual memory addresses according to the request, wherein a result of the remapping is the compaction that includes the plurality of page-aligned large objects being contiguous in the large object area, and wherein the remapping is performed by a processor of a computer system.

A system and computer program product corresponding to the above-summarized method are also described and claimed herein.

One or more embodiments of the present invention advantageously use virtual memory management to reduce fragmentation without requiring the copying of data in memory.

DETAILED DESCRIPTION OF THE INVENTION

Overview

One or more embodiments of the present invention are directed to a compaction method, system and computer program product that use virtual memory management to change virtual memory address ranges in a large object area to align contiguous locations of free virtual memory and to align contiguous locations of live virtual memory by adjusting virtual memory mapping on physical memory. Aligning free virtual memory as contiguous locations and aligning live virtual memory as contiguous locations may include using remapping operations to swap free and live pages. The compaction technique disclosed herein may reduce fragmentation without requiring the resource-intensive copying of data in memory. One embodiment of the compaction method, system and computer program product disclosed herein utilizes a kernel memory management driver, also known as ("a.k.a.") kernel driver or kernel mode driver, that allows multiple virtual memory remappings to be performed in a single kernel transition so that page-aligned large objects become contiguous in a large object area. As used herein, a kernel transition is defined as a sequence of steps that are required for a thread executing in user mode space to transition to executing code in kernel mode space. The kernel driver may have direct access to underlying kernel application programming interfaces (APIs).

Figure 1:
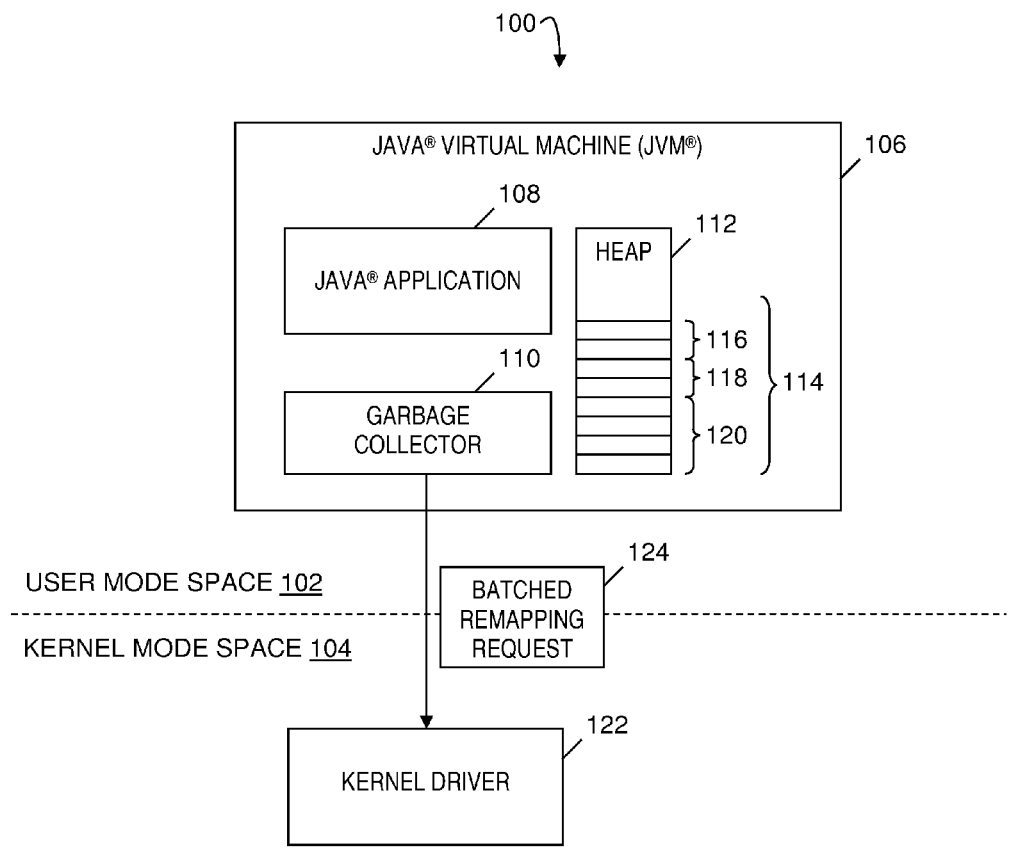
FIG. 1 is a block diagram of a system for performing garbage collection in large object areas by batched remapping of virtual memory addresses, in accordance with embodiments of the present invention.

System for Batched Remapping of Virtual Memory Addresses for Garbage Collection in Large Object Areas FIG. 1 is a block diagram of a system for performing garbage collection in large object areas by batched remapping of virtual memory addresses, in accordance with embodiments of the present invention. Large object area garbage collection system 100 includes a user mode space 102 and a kernel mode space 104. The user mode space 102 includes a JAVA® Virtual Machine (JVM®) 106, which includes a JAVA® application 108, a software-based garbage collector 110 and a heap 112. Heap 112 is an area of memory used by JVM® 106 for dynamic memory allocation and includes a large object area 114. Although three large objects 116, 118, and 120 are stored in large object area 114, the present invention contemplates that system 100 may include any plurality of large objects stored in large object area 114.

Garbage collector 110 performs automatic memory management that includes identifying objects in a program that cannot be accessed in the future by the program and reclaiming the memory used by the identified objects. Every object has a unique identifier and has a contiguous location in virtual memory. The number of bytes required by an object is arbitrary, but the memory manager rounds up the allocation size to a multiple of the virtual memory page size. Therefore, the virtual size of an object is always greater than or equal to the actual size of the object. A memory manager (not shown) page aligns large objects in a large object area (LOA) in preparation for a compaction phase of garbage collection that includes remapping virtual memory addresses of the large objects. As used herein, a large object is defined as any object allocation that exceeds a predefined threshold value. For example, MICROSOFT® Common Language Runtime (CLR) defines a large object as any object allocation exceeding 85K bytes. As used herein, a large object area is defined as a memory address space reserved for large objects. The LOA has a base virtual address. A LOA may be a portion of a heap or a portion of virtual memory in which large objects are stored and segregated from other objects that are not large objects. The boundaries of a large object area are specified by the garbage collector 110.

System 100 also includes a kernel driver 122. Garbage collector 110 sends a single batched remapping request 124 to kernel driver 122 to perform one or more remappings in a single kernel transition. Request 124 specifies the virtual memory addresses of virtual memory pages on which large objects are aligned, where the virtual memory addresses are to be remapped to perform the compaction of the large objects. Kernel driver 122 validates the virtual memory addresses included in request 124 and remaps the virtual memory pages (i.e., remaps the virtual memory addresses) so that the large objects are contiguous in the large object area. In one embodiment, the remapping performed by kernel driver 122 is facilitated by the kernel driver's direct access to underlying kernel APIs (e.g., ZwMapViewOfSection, ZwOpenSection, ZwUnmapViewOfSection, and ZwClose, which are routines in a kernel mode library that supports kernel mode drivers in the WINDOWS® Driver Kit (WDK) offered by MICROSOFT® Corporation located in Redmond, Wash.). The functionality of the components of system 100 is also described below relative to the discussion of FIG. 2.

Figure 2:
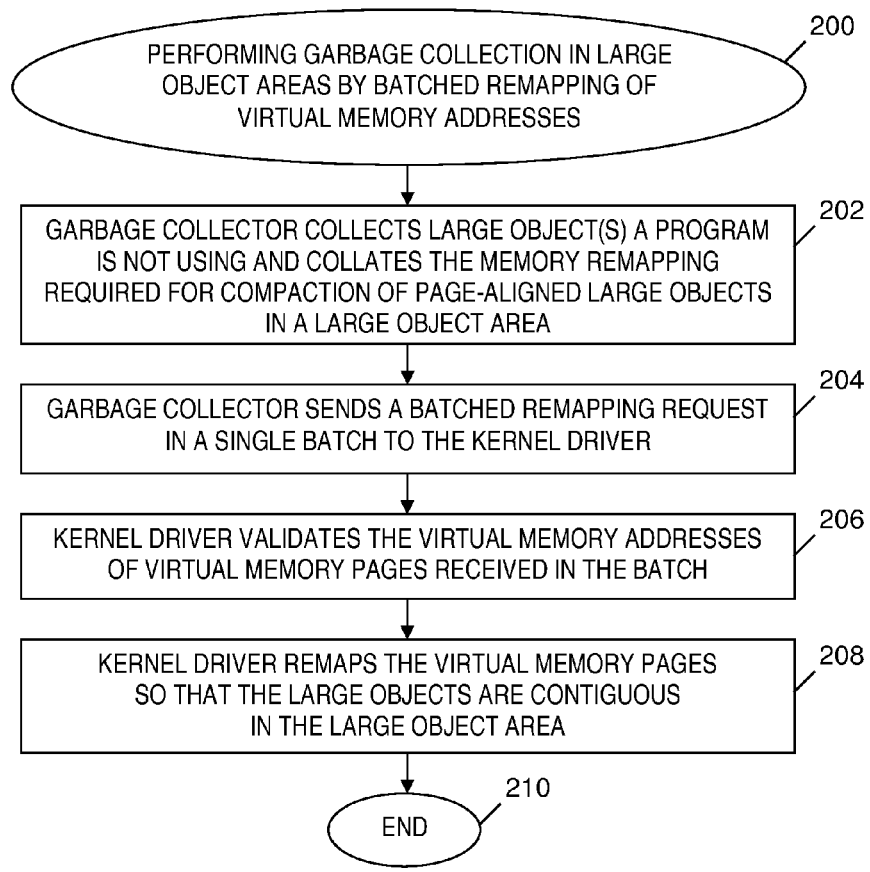
FIG. 2 is a flowchart of a process for performing garbage collection in large object areas by batched remapping of virtual memory addresses in the system of FIG. 1, in accordance with embodiments of the present invention.

Process of Batched Remapping of Virtual Memory Addresses for Garbage Collection in Large Object Areas FIG. 2 is a flowchart of a process for performing garbage collection in large object areas by batched remapping of virtual memory addresses in the system of FIG. 1, in accordance with embodiments of the present invention. The large object area garbage collection that utilizes virtual memory address remapping begins at step 200 with an execution of the garbage collector 110 (see FIG. 1). Prior to step 202, a table (a.k.a. object size and address table) stores identifiers, virtual memory addresses (a.k.a. virtual addresses), virtual memory sizes (a.k.a. virtual sizes), and actual sizes (i.e., physical memory sizes) of large objects that are included in LOA 114 (see FIG. 1).

In step 202, the garbage collector 110 (see FIG. 1) determines a first set of one or more large objects that a program uses or will use and a second set of one or more large objects that the program is not using and will not use. The garbage collector 110 (see FIG. 1) garbage collects the large object(s) that were determined to be in the aforementioned second set. The garbage collection of the large object(s) in step 202 results in a fragmentation of virtual memory address space, including a fragmentation of large object area 114 (see FIG. 1). That is, the garbage collection in step 202 results in large object area 114 (see FIG. 1) including one or more free virtual memory pages (a.k.a. free pages) interspersed among the page-aligned large objects.

In step 202, the garbage collector 110 (see FIG. 1) also identifies and collates the memory remapping that the garbage collector requires for a compaction of page-aligned large objects (e.g., large object 116 in FIG. 1) included in large object area 114 (see FIG. 1). Collating the memory remapping in step 202 also includes determining a mapping from the aforementioned object size and address table to a new layout of large objects in the LOA, so that the ranges of virtual memory addresses of the large objects are contiguous in the LOA. In one embodiment, the garbage collector executes the algorithm presented below to accumulate virtual addresses to determine the mapping in step 202.

Algorithm:
  Initialize the next virtual address to the LOA base address
  Initialize the next large object as a first large object in the aforementioned first set of large object(s)
  While there is at least one live large object in the first set that has not been assigned to a virtual address by this algorithm, do the following three steps:
    Assign the next large object in the first set to the next virtual address
    Add the virtual size of the next large object to the next virtual address (i.e., next virtual address becomes (next virtual address+virtual size of the next large object))
    If at least one live large object in the first set has not been assigned to a virtual address by this algorithm, then update the next large object to be another live large object in the first set that has not been assigned to a virtual address by this algorithm The "Assign" step in the algorithm presented above re-assigns large objects from previously assigned virtual addresses (i.e., the virtual addresses associated with the large objects by the object size and address table) to the virtual addresses determined by the algorithm. Furthermore, the garbage collector may store the virtual addresses assigned by the algorithm in a second table (a.k.a. a remapping table). In step 202, the garbage collector 110 (see FIG. 1) defines a remapping between the large objects in the aforementioned object size and address table and the virtual addresses assigned by the algorithm presented above (e.g., by mapping large objects identified in the object size and address table to the virtual addresses in the remapping table).

In step 204, garbage collector 110 (see FIG. 1) sends batched remapping request 124 (see FIG. 1) in a single batch to kernel driver 122 (see FIG. 1). Batched remapping request 124 (see FIG. 1) indicates virtual memory addresses of virtual memory pages that are to be remapped in the large object area 114 (see FIG. 1) according to the remapping defined in step 202. The remapping of the virtual memory addresses ensures that all large objects in the large object area become contiguous (i.e., the large objects are in contiguous virtual memory locations) and all free pages in the large object area become contiguous. In one embodiment, step 204 includes the garbage collector 110 (see FIG. 1) sending the aforementioned remapping table to the kernel driver 122 (see FIG. 1) in a single call. The remapping table may include one or more objects that are no longer required by the program. In one embodiment, the garbage collector omits from the remapping table one or more objects that do not need to be moved (i.e., object(s) that were not re-assigned to different virtual addresses in step 202).

In step 206, kernel driver 122 (see FIG. 1) validates virtual memory addresses of virtual memory pages included in batched remapping request 124 (see FIG. 1). The validation in step 206 includes (1) verifying that there are no overlapping objects in the virtual memory address space and (2) verifying that the virtual memory address space of each large object has not changed.

In step 208, kernel driver 122 (see FIG. 1) remaps the virtual memory pages according to the batched remapping request 124 (see FIG. 1), which results in the large objects in the large object area 114 (see FIG. 1) being contiguous and the free pages in the large object area 114 (see FIG. 1) being contiguous. Allocated to each large object are zero or more physical memory pages (or locations in a page file if the large object has been paged out). Each resident physical page has a location in virtual memory. For a large object that is being moved according to the remapping request sent in step 204, the kernel driver gives each resident physical page of the large object a different location in virtual memory by updating a virtual memory page table through one or more operating system calls.

In one embodiment, the kernel driver 122 (see FIG. 1) receives the remapping table in the single call in step 204 and then makes all of the virtual memory page table changes in one operation. That is, a single kernel transition is performed (e.g., in step 204) by loading and executing a kernel driver prior to the kernel driver performing a single operation that makes the multiple virtual memory page table changes in step 208.

In one embodiment, a kernel transition is a sequence of steps that are required for a thread executing in user mode space 102 (see FIG. 1) to transition to executing code in kernel mode space 104 (see FIG. 1). A kernel transition may be achieved through a special software interrupt. A kernel transition is relatively slow and therefore it is advantageous in a high performance system to perform as few kernel transitions as possible. Furthermore, the facilities available to code running in kernel mode space 104 (see FIG. 1) are more privileged than code running in user mode space 102 (see FIG. 1). For example, it is not possible to manipulate virtual memory page tables in user mode space 102 (see FIG. 1). An application running in user mode space 102 (see FIG. 1) that wants to perform a privileged operation such as manipulating virtual memory page tables in step 208 must perform a kernel transition and then perform the privileged operation in kernel mode space 104 (see FIG. 1). The application that needs to perform a kernel transition loads and executes a set of code (i.e., kernel driver 122 in FIG. 1) in kernel mode space 104 (see FIG. 1).

The large object area garbage collection that utilizes virtual memory address remapping ends at step 210.

The post-compaction fix up phase of garbage collection is unaltered by the process of FIG. 2. The application memory must still be scanned to identify large object references that have moved position in memory. The process disclosed herein does not introduce any change to the performance characteristics of the fix up phase of garbage collection.

Remapping Example

Table 1 presented below includes the virtual addresses, actual sizes and virtual sizes of four large objects having the identifiers (IDs) 310, 311, 312 and 314 (see the description of the object size and address table stored prior to step 202 in FIG. 2).

TABLE 1

| LARGE OBJECT ID | VIRTUAL ADDRESS | ACTUAL SIZE | VIRTUAL SIZE |
|---|---|---|---|
| 310 | $VA^{310}$ | $AS^{310}$ | $VS^{310}$ |
| 311 | $VA^{311}$ | $AS^{311}$ | $VS^{311}$ |
| 312 | $VA^{312}$ | $AS^{312}$ | $VS^{312}$ |
| 314 | $VA^{314}$ | $AS^{314}$ | $VS^{314}$ |

Garbage collector 110 (see FIG. 1) determines that objects having IDs 310, 312 and 314 are in use by a program, but that the object having ID 311 is not in use and will not be in use by the program. Garbage collector 110 (see FIG. 1) garbage collects the object having ID 311, which results in virtual memory becoming fragmented, as shown in the virtual memory on the left side of FIG. 3.

Figure 3:
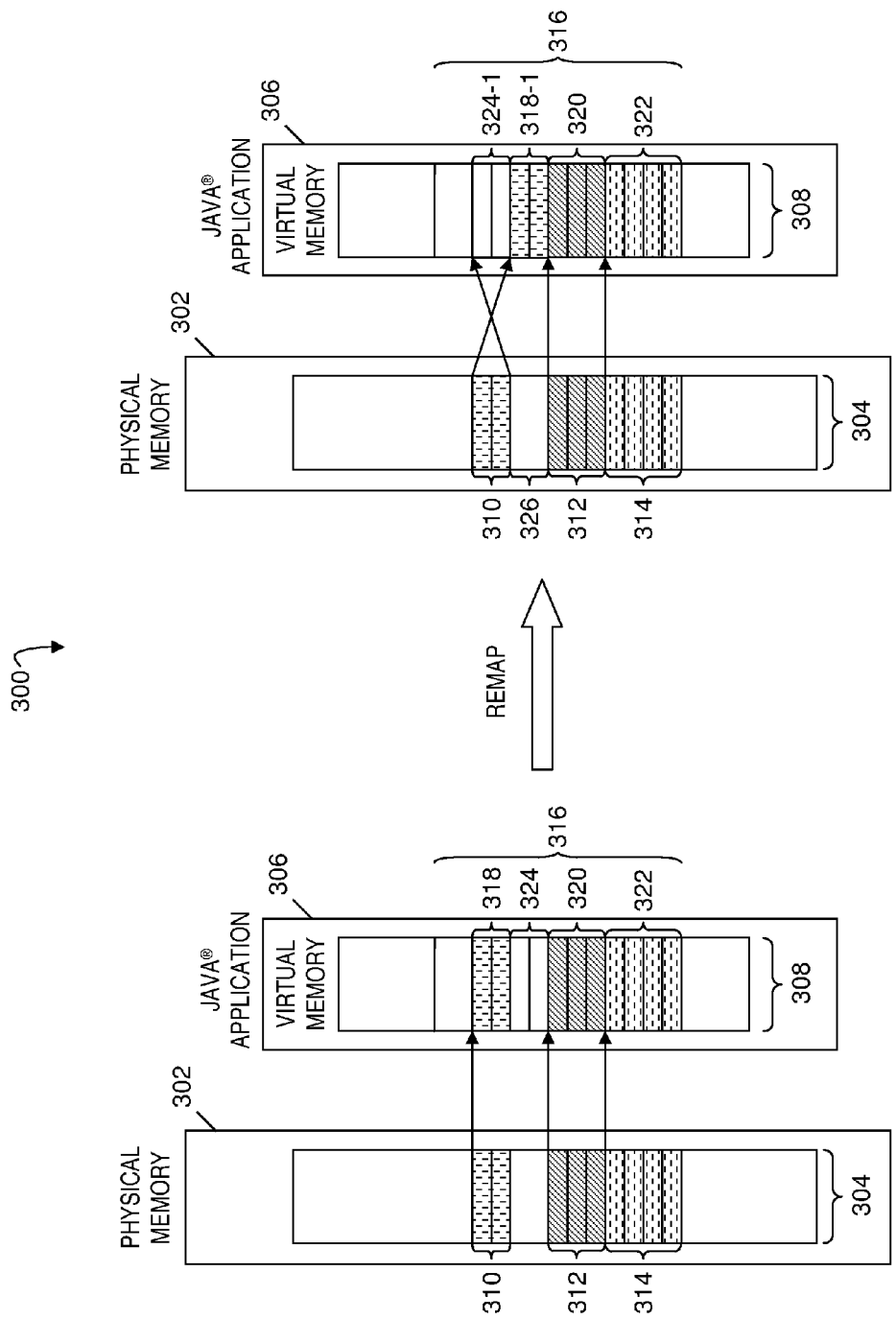
FIG. 3 depicts an exemplary remapping of virtual memory addresses performed by the process of FIG. 2, in accordance with embodiments of the present invention.

FIG. 3 depicts an exemplary remapping of virtual memory addresses performed by the process of FIG. 2, in accordance with embodiments of the present invention. Remapping example 300 includes a physical memory 302, which includes physical memory locations 304. Example 300 also includes a JAVA® application 306, which includes a virtual memory 308. Physical memory locations 304 store large objects 310, 312 and 314. Large objects 310, 312 and 314 correspond to the large objects having IDs 310, 312 and 314, respectively, in Table 1. It should be noted that unlike the depiction of physical memory 304 shown in FIG. 3, physical pages for any given object may be (and normally are) scattered widely through physical memory or may not be in memory at all if the pages have been paged out to a backing store (not shown; e.g., a page file).

Virtual memory 308 includes a large object area 316, which stores large objects 318, 320 and 322. The arrows between physical memory locations 304 and virtual memory 308 indicate mappings of large object 310 to large object 318, large object 312 to large object 320, and large object 314 to large object 322. For example, the arrow from object 310 to object 318 indicates a mapping of a range of memory addresses of object 310 to a range of virtual addresses of object 318. The left side of FIG. 3 (i.e., to the left of the arrow labeled "Remap") illustrates the mappings between physical memory locations 304 and virtual memory 308 prior to a remapping performed according to the process of FIG. 2. Virtual memory 308 to the left of the arrow labeled "Remap" illustrates non-contiguous live pages. For example, there is a free (i.e., unmapped) range of virtual addresses 324 between object 318 and object 320, thereby making the live pages of object 318 non-contiguous with the live pages of object 320 (i.e., virtual memory 308 to the left of the "Remap" arrow is fragmented).

Before the remapping occurs, the algorithm presented above in the discussion of FIG. 2 is executed to perform the following re-assignments and the re-assigned virtual addresses are stored in the remapping table:

$VA^{310}$ (see Table 1) is re-assigned as the LOA base address $VA^{312}$ (see Table 1) is re-assigned as the address: LOA base address+$VS^{310}$ $VA^{314}$ (see Table 1) is re-assigned as the address: LOA base address+$VS^{310}$+$VS^{312}$ After the garbage collector 110 (see FIG. 1) sends a batched remapping request to the kernel driver 122 (see FIG. 1) in a single call, where the remapping request specifies the large objects to be remapped according to the remapping table (see step 204 in FIG. 2) and after the kernel driver validates the virtual memory addresses in the remapping table (see step 206 in FIG. 2), then the kernel driver remaps the large objects by updating the virtual memory page tables according to the remapping table (see step 208 in FIG. 2).

The right side of FIG. 3 (i.e., to the right of the arrow labeled "Remap") illustrates mappings between physical memory locations 304 and virtual memory 308 after a remapping performed according to step 208 in the process of FIG. 2. Virtual memory 308 to the right of the arrow labeled "Remap" illustrates contiguous live pages resulting from a swap of pages in range 324 with the pages in object 318. Virtual memory 308 to the right of the arrow labeled "Remap" results from a remapping in step 208 of FIG. 2, in which the object 310 is remapped to the object in the range of virtual addresses 318-1 (a.k.a. object 318-1) (which was the free range of virtual addresses 324 prior to the remapping) and the address range 326 is remapped to the range of virtual addresses 324-1 (which was the range of virtual addresses for object 318 prior to the remapping). As illustrated by the virtual memory 308 to the right of the arrow labeled "Remap", the remapping in FIG. 3 results in all live pages of the large objects in large object area 316 being contiguous and all free pages in large object area 316 being contiguous. That is, the virtual memory 308 resulting from the remapping of the process of FIG. 2 includes no free pages and/or uncommitted pages interspersed with the live pages of objects 318-1, 320 and 322. The resulting contiguous live pages and contiguous free pages in virtual memory 308 on the right side of FIG. 3 are attained by the process of FIG. 2 without requiring copying data in memory.

Prototype Code

Compaction through virtual memory remapping is prototyped in this section to explore its performance characteristics. The C++ code in this section shows a piece of physical memory (page file backed) being allocated through the WINDOWS® API CreateFileMapping. The prototype in this section then maps the allocated memory into the application's virtual address space using MapViewOfFileEx. At any time, the block of memory in the prototype can be unmapped from the address space using UnmapViewOfFile. The code in this section simply tries a few different virtual addresses to map the memory starting at 0x640000.

```
HRESULT Commit(ULONG TotalSize)
{
    HANDLE hMapping = CreateFileMapping(
        (HANDLE) 0xFFFFFFFF,    // Page file backed block
        NULL,          // No security attributes
        PAGE_READWRITE,      // Desired access mode
        (DWORD) 0,    // Size high order 32 bits
        TotalSize,     // Low order 32 size bits
        (LPCTSTR) NULL);    // Unnamed mapping object
    // Construct HRESULT from error
    if (hMapping == NULL) {
        DWORD Error = GetLastError( );
        HRESULT hr = HRESULT_FROM_WIN32(Error);
        return (HRESULT) hr;
    }
    LPBYTE pMappedAddress, pStartAddress = (LPBYTE) 0x640000;
    for (LONG Loop = 0;Loop < 99;Loop++,pStartAddress += TotalSize)
    {
        pMappedAddress = (PBYTE) MapViewOfFileEx(
            hMapping,      // Previously opened file mapping
            FILE_MAP_WRITE,    // Access mode must also match
            (DWORD) 0,    // High order 32 bits of the size
            (DWORD) 0,    // Also start the mapping at base
            TotalSize,     // Total number of bytes to map
```

```
            pStartAddress);     // Virtual memory start address
        if (pMappedAddress != NULL) break;
    }
    // Construct HRESULT from error
    if (pMappedAddress == NULL) {
        DWORD Error = GetLastError( );
        HRESULT hr = HRESULT_FROM_WIN32(Error);
        return (HRESULT) hr;
    }
    return NOERROR;
}
```

Implementing a real large object area garbage collection using the prototype in this section would be inefficient because each of the WINDOWS® APIs utilized in the prototype requires a separate kernel transition, thereby making the process too expensive for the remapping of many large objects after a collection.

Computer System

Figure 4:
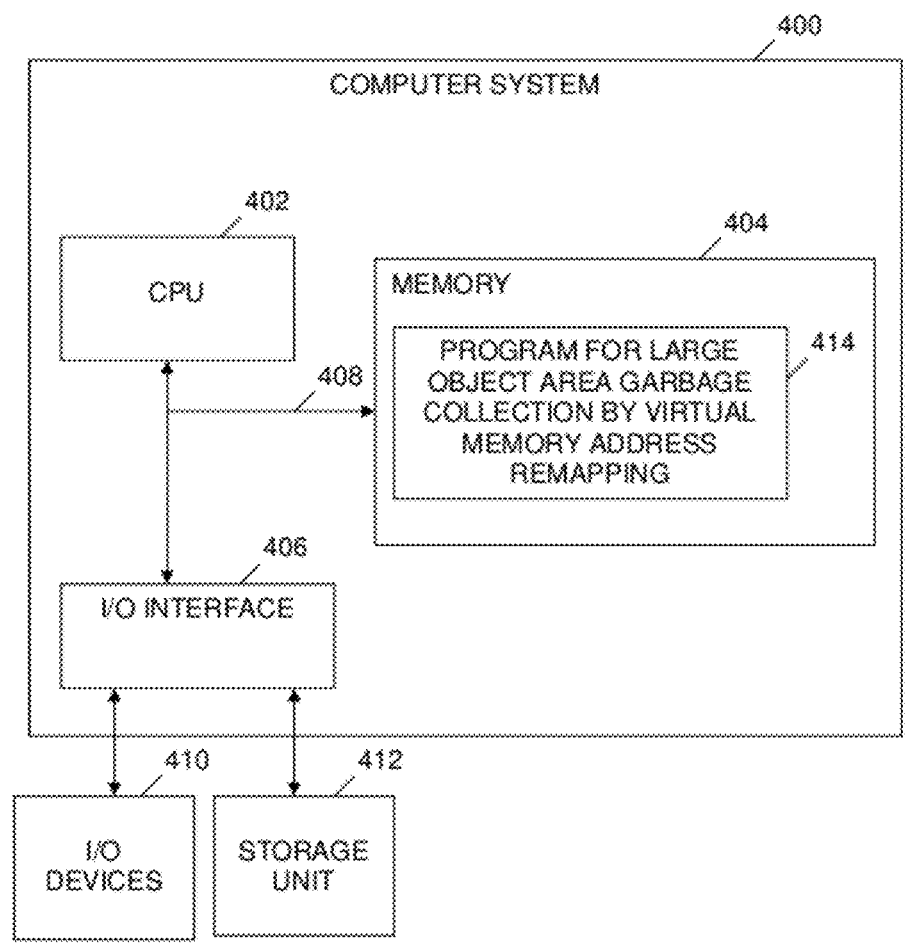
FIG. 4 is a block diagram of a computer system that implements the process of FIG. 2, in accordance with embodiments of the present invention.

FIG. 4 is a block diagram of a computer system that implements the process of FIG. 2, in accordance with embodiments of the present invention. Computer system 400 generally comprises a central processing unit (CPU) 402, a memory 404, an input/output (I/O) interface 406, and a bus 408. Further, computer system 400 is coupled to I/O devices 410 and a computer data storage unit 412. CPU 402 performs computation and control functions of computer system 400. CPU 402 may comprise a single processing unit, or be distributed across one or more processing units in one or more locations (e.g., on a client and server).

Memory 404 may comprise any known type of computer data storage media, including bulk storage, magnetic media, optical media, random access memory (RAM), read-only memory (ROM), a data cache, etc. In one embodiment, cache memory elements of memory 404 provide temporary storage of at least some program code (e.g., code for program 414) in order to reduce the number of times code must be retrieved from bulk storage during execution. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 400, and may comprise any type of transmission link, including electrical, optical, wireless, etc.

I/O interface 406 also allows computer system 400 to store and retrieve information (e.g., data or program instructions such as code of program 414) from an auxiliary storage device such as computer data storage unit 412 or another computer data storage unit (not shown). Computer data storage unit 412 may be a non-volatile storage device, such as a magnetic disk drive (i.e., hard disk drive) or an optical disc drive (e.g., a CD-ROM drive which receives a CD-ROM disk).

Memory 404 includes computer program code for the program 414 for large object area garbage collection by virtual memory address remapping (e.g., logic for the process of FIG. 2). Further, memory 404 may include other systems not shown in FIG. 4, such as an operating system (e.g., Linux)

that runs on CPU 402 and provides control of various components within and/or connected to computer system 400.

Memory 404, storage unit 412, and/or one or more other computer data storage units (not shown) that are operatively coupled to computer system 400 may store the addresses of large objects in large object area 114 (see FIG. 1). The process of FIG. 2 may result in a transformation that: (1) transforms a computer data storage unit from a store of addresses in a large object area that includes non-contiguous large objects to a store of addresses in a large object area that includes only contiguous large objects.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 100 in FIG. 1 or computer system 400). Furthermore, an embodiment of the present invention may take the form of a computer program product embodied in any tangible medium of expression (e.g., memory 404 or computer data storage unit 412) having computer-usable program code (e.g., code for program 414) embodied or stored in the medium.

Any combination of one or more computer-usable or computer-readable medium(s) (e.g., memory 404 and/or computer data storage unit 412) may be utilized. The computer-usable or computer-readable medium may be, for example but not limited to, an electronic, magnetic, optical, or semiconductor system, apparatus or device. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program 414 is printed, as the program 414 can be electronically captured via, for instance, optical scanning of the paper or other medium, then compiled, interpreted, or otherwise processed in a suitable manner, if necessary, and then stored, respectively, in a computer memory 404. In the context of this document, a computer-usable or computer-readable medium may be any medium that can store the program for use by or in connection with the instruction execution system, apparatus, or device. The computer-usable program code may be transmitted using any appropriate medium, including but not limited to wireless, wireline, optical fiber cable, radio frequency (RF), etc.

Computer program code (e.g., code of program 414) for carrying out operations of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. Any one of the aforementioned computers or servers may be computer system 400. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIG. 2) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., code of program 414). These computer program instructions may be provided to a processor (e.g., CPU 402) of a general purpose computer, special purpose computer, or other programmable data processing apparatus to produce a machine, such that the instructions, when executed by the processor of the computer or other programmable data processing apparatus, implement the functions/acts specified in the flowchart and/or block diagram block or blocks.

These computer program instructions may also be stored in a computer-readable medium (e.g., memory 404 or computer data storage unit 412) that can direct a computer (e.g., computer system 400) or other programmable data processing apparatus to function in a particular manner, such that storing the instructions in the computer-readable medium produces an article of manufacture including instructions which implement the function/act specified in the flowchart and/or block diagram block or blocks.

The computer program instructions may also be loaded onto a computer (e.g., computer system 400) or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for batched remapping of virtual memory addresses for garbage collection in large object areas. Thus, an embodiment of the present invention discloses a process for supporting computer infrastructure, comprising integrating, hosting, maintaining and deploying computer-readable code (e.g., code of program 414) into a computer system (e.g., computer system 400), wherein the code in combination with the computer system is capable of performing the process of batched remapping of virtual memory addresses for garbage collection in large object areas.

In another embodiment, the process steps of the invention are provided to customers on a subscription, advertising and/or fee basis. That is, a service provider, such as a Solution Integrator, can offer to create, maintain, support, etc. processes for batched remapping of virtual memory addresses for garbage collection in large object areas. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIGS. 1 and 4 illustrate the architecture, functionality, and operation of possible implementations of systems, methods, and computer program products according to various embodiments of the present invention. In this regard, each block in the flowchart or block diagrams may represent a module, segment, or portion of code (e.g., code of program 414), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of batched remapping of virtual memory addresses for garbage collection in a large object area, said method comprising:
   determining a mapping from a first table to a second table, wherein said first table includes a plurality of identifiers of a plurality of page-aligned large objects included in a large object area of a virtual memory, a first plurality of virtual memory addresses to which said page-aligned large objects are initially assigned, and a plurality of virtual memory sizes of said page-aligned large objects, wherein said second table includes a second plurality of virtual memory addresses to which said page-aligned large objects are assigned for a compaction of said plurality of page-aligned large objects, and wherein said page-aligned large objects are not contiguous in said large object area of said virtual memory;
   receiving a request in a single batch, wherein said request includes said second plurality of virtual memory addresses and requests a remapping of said plurality of page-aligned large objects to said second plurality of virtual memory addresses;
   validating said second plurality of virtual memory addresses included in said request; and
   remapping said plurality of page-aligned large objects to said second plurality of virtual memory addresses according to said request, wherein a result of said remapping is said compaction of said plurality of page-aligned large objects that includes said plurality of page-aligned large objects being contiguous in said large object area of said virtual memory, and wherein said remapping is performed by a processor of a computer system.

2. The method of claim 1, wherein the receiving of said request includes receiving said request via a single kernel transition, and wherein the remapping of said plurality of page-aligned large objects to said second plurality of virtual memory addresses includes reassigning said plurality of page-aligned large objects from said first plurality of virtual memory addresses in said first table to said second plurality of virtual memory addresses in said second table by a kernel driver performing a single operation that makes a plurality of changes to a virtual memory page table.

3. The method of claim 2, wherein the remapping of said plurality of page-aligned large objects to said second plurality of virtual memory addresses further includes the reassigning of said plurality of page-aligned large objects without requiring a copying of data in a physical memory.

4. The method of claim 1, wherein the determining of said mapping from said first table to said second table comprises:
   initializing a next virtual memory address to a base address of said large object area of said virtual memory;
   initializing a next page-aligned large object to a first page-aligned large object that is not assigned said next virtual memory address and that is included in said plurality of page-aligned large objects; and
   while at least one page-aligned large object of said plurality of page-aligned large objects is not assigned said next virtual memory address, performing the steps of:
      assigning said next virtual memory address to said next page-aligned large object;
      updating said next virtual memory address as a sum of a virtual memory size of said next page-aligned large object and said next virtual memory address; and
      if another page-aligned large object of said plurality of page-aligned large objects is not assigned said next virtual memory address via said assigning of said next virtual memory address, then updating said next page-aligned large object as said another page-aligned large object.

5. The method of claim 4, wherein the determining of said mapping from said first table to said second table further comprises storing said next virtual memory address in said second plurality of virtual memory addresses included in said second table.

6. The method of claim 1, wherein the validating of said second plurality of virtual memory addresses includes:
   verifying that no virtual memory addresses of said second plurality of virtual memory addresses are assigned to overlapping objects of said plurality of page-aligned large objects; and
   verifying that a virtual memory address space of each page-aligned large object of said plurality of page-aligned large objects is unchanged.

7. The method of claim 1, wherein said large object area of said virtual memory includes one or more free pages interspersed among a plurality of live pages in said large object area of said virtual memory prior to said remapping, wherein said plurality of live pages includes said plurality of page-aligned large objects, and wherein said remapping includes aligning said one or more free pages as contiguous free pages in said large object area of said virtual memory.

8. A computer system comprising:
   a processor and a computer-readable memory unit coupled to said processor, said memory unit containing instructions that when executed by said processor implement a method of batched remapping of virtual memory addresses for garbage collection in a large object area, said method comprising:
      determining a mapping from a first table to a second table, wherein said first table includes a plurality of identifiers of a plurality of page-aligned large objects included in a large object area of a virtual memory, a first plurality of virtual memory addresses to which said page-aligned large objects are initially assigned, and a plurality of virtual memory sizes of said page-aligned large objects, wherein said second table includes a second plurality of virtual memory addresses to which said page-aligned large objects are assigned for a compaction of said plurality of page-aligned large objects, and wherein said page-aligned large objects are not contiguous in said large object area of said virtual memory;

receiving a request in a single batch, wherein said request includes said second plurality of virtual memory addresses and requests a remapping of said plurality of page-aligned large objects to said second plurality of virtual memory addresses;

validating said second plurality of virtual memory addresses included in said request; and remapping said plurality of page-aligned large objects to said second plurality of virtual memory addresses according to said request, wherein a result of said remapping is said compaction of said plurality of page-aligned large objects that includes said plurality of page-aligned large objects being contiguous in said large object area of said virtual memory, and wherein said remapping is performed by said processor of said computer system.

9. The system of claim 8, wherein the receiving of said request includes receiving said request via a single kernel transition, and wherein the remapping of said plurality of page-aligned large objects to said second plurality of virtual memory addresses includes reassigning said plurality of page-aligned large objects from said first plurality of virtual memory addresses in said first table to said second plurality of virtual memory addresses in said second table by a kernel driver performing a single operation that makes a plurality of changes to a virtual memory page table.

10. The system of claim 9, wherein the remapping of said plurality of page-aligned large objects to said second plurality of virtual memory addresses further includes the reassigning of said plurality of page-aligned large objects without requiring a copying of data in a physical memory.

11. The system of claim 8, wherein the determining of said mapping from said first table to said second table comprises:
    initializing a next virtual memory address to a base address of said large object area of said virtual memory;
    initializing a next page-aligned large object to a first page-aligned large object that is not assigned said next virtual memory address and that is included in said plurality of page-aligned large objects; and
    while at least one page-aligned large object of said plurality of page-aligned large objects is not assigned said next virtual memory address, performing the steps of:
        assigning said next virtual memory address to said next page-aligned large object;
        updating said next virtual memory address as a sum of a virtual memory size of said next page-aligned large object and said next virtual memory address; and
        if another page-aligned large object of said plurality of page-aligned large objects is not assigned said next virtual memory address via said assigning of said next virtual memory address, then updating said next page-aligned large object as said another page-aligned large object.

12. The system of claim 11, wherein the determining of said mapping from said first table to said second table further comprises storing said next virtual memory address in said second plurality of virtual memory addresses included in said second table.

13. The system of claim 8, wherein the validating of said second plurality of virtual memory addresses includes:
    verifying that no virtual memory addresses of said second plurality of virtual memory addresses are assigned to overlapping objects of said plurality of page-aligned large objects; and
    verifying that a virtual memory address space of each page-aligned large object of said plurality of page-aligned large objects is unchanged.

14. The system of claim 8, wherein said large object area of said virtual memory includes one or more free pages interspersed among a plurality of live pages in said large object area of said virtual memory prior to said remapping, wherein said plurality of live pages includes said plurality of page-aligned large objects, and wherein said remapping includes aligning said one or more free pages as contiguous free pages in said large object area of said virtual memory.

15. A computer program product, comprising:
    a computer-readable, tangible, non-transitory storage device; and
    a computer-readable program code stored on the computer-readable, tangible, non-transitory storage device, said computer-readable program code containing instructions that, when executed by a processor of a computer system, implement a method of batched remapping of virtual memory addresses for garbage collection in a large object area, said method comprising:
        determining a mapping from a first table to a second table, wherein said first table includes a plurality of identifiers of a plurality of page-aligned large objects included in a large object area of a virtual memory, a first plurality of virtual memory addresses to which said page-aligned large objects are initially assigned, and a plurality of virtual memory sizes of said page-aligned large objects, wherein said second table includes a second plurality of virtual memory addresses to which said page-aligned large objects are assigned for a compaction of said plurality of page-aligned large objects, and wherein said page-aligned large objects are not contiguous in said large object area of said virtual memory;
        receiving a request in a single batch, wherein said request includes said second plurality of virtual memory addresses and requests a remapping of said plurality of page-aligned large objects to said second plurality of virtual memory addresses;
        validating said second plurality of virtual memory addresses included in said request; and
        remapping said plurality of page-aligned large objects to said second plurality of virtual memory addresses according to said request, wherein a result of said remapping is said compaction of said plurality of page-aligned large objects that includes said plurality of page-aligned large objects being contiguous in said large object area of said virtual memory, and wherein said remapping is performed by said processor of said computer system.

16. The program product of claim 15, wherein the receiving of said request includes receiving said request via a single kernel transition, and wherein the remapping of said plurality of page-aligned large objects to said second plurality of virtual memory addresses includes reassigning said plurality of page-aligned large objects from said first plurality of virtual memory addresses in said first table to said second plurality of virtual memory addresses in said second table by a kernel driver performing a single operation that makes a plurality of changes to a virtual memory page table.

17. The program product of claim 16, wherein the remapping of said plurality of page-aligned large objects to said second plurality of virtual memory addresses further includes the reassigning of said plurality of page-aligned large objects without requiring a copying of data in a physical memory.

18. The program product of claim 15, wherein the determining of said mapping from said first table to said second table comprises:

- initializing a next virtual memory address to a base address of said large object area of said virtual memory;
- initializing a next page-aligned large object to a first page-aligned large object that is not assigned said next virtual memory address and that is included in said plurality of page-aligned large objects; and
- while at least one page-aligned large object of said plurality of page-aligned large objects is not assigned said next virtual memory address, performing the steps of:
  - assigning said next virtual memory address to said next page-aligned large object;
  - updating said next virtual memory address as a sum of a virtual memory size of said next page-aligned large object and said next virtual memory address; and
  - if another page-aligned large object of said plurality of page-aligned large objects is not assigned said next virtual memory address via said assigning of said next virtual memory address, then updating said next page-aligned large object as said another page-aligned large object.

19. The program product of claim 18, wherein the determining of said mapping from said first table to said second table further comprises storing said next virtual memory address in said second plurality of virtual memory addresses included in said second table.

20. The program product of claim 15, wherein the validating of said second plurality of virtual memory addresses includes:

- verifying that no virtual memory addresses of said second plurality of virtual memory addresses are assigned to overlapping objects of said plurality of page-aligned large objects; and
- verifying that a virtual memory address space of each page-aligned large object of said plurality of page-aligned large objects is unchanged.

* * * * *